United States Patent
Okada et al.

(10) Patent No.: US 12,265,649 B2
(45) Date of Patent: Apr. 1, 2025

(54) SYNTHETIC DATA GENERATION APPARATUS, METHOD FOR THE SAME, AND PROGRAM

(71) Applicant: NIPPON TELEGRAPH AND TELEPHONE CORPORATION, Chiyoda-ku (JP)

(72) Inventors: Rina Okada, Musashino (JP); Satoshi Hasegawa, Musashino (JP); Shogo Masaki, Musashino (JP); Satoshi Tanaka, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 280 days.

(21) Appl. No.: 16/753,037

(22) PCT Filed: Oct. 5, 2018

(86) PCT No.: PCT/JP2018/037309
§ 371 (c)(1),
(2) Date: Apr. 2, 2020

(87) PCT Pub. No.: WO2019/073912
PCT Pub. Date: Apr. 18, 2019

(65) Prior Publication Data
US 2020/0257824 A1 Aug. 13, 2020

(30) Foreign Application Priority Data

Oct. 13, 2017 (JP) .................. 2017-199200

(51) Int. Cl.
*G06F 21/62* (2013.01)
*G06F 16/25* (2019.01)
*G06F 16/28* (2019.01)

(52) U.S. Cl.
CPC ........ *G06F 21/6254* (2013.01); *G06F 16/258* (2019.01); *G06F 16/285* (2019.01)

(58) Field of Classification Search
CPC ... G06F 21/6254; G06F 16/258; G06F 16/285
See application file for complete search history.

(56) References Cited

U.S. PATENT DOCUMENTS

2011/0201314 A1* 8/2011 Marsico .................. H04W 4/18
455/466
2013/0197875 A1 8/2013 Shirley et al.
(Continued)

FOREIGN PATENT DOCUMENTS

CN 101505318 A 8/2009

OTHER PUBLICATIONS

International Search Report issued Dec. 25, 2018 in PCT/JP2018/037309, 2 pages.
(Continued)

*Primary Examiner* — Theodore C Parsons
(74) *Attorney, Agent, or Firm* — Oblon, McClelland, Maier & Neustadt, L.L.P.

(57) ABSTRACT

A synthetic data generation apparatus codes a value of each of category attributes contained in original data into a value of a numerical attribute in accordance with a coding rule; generates first synthetic data from the original data after coding using a synthetic data generation method for numerical attributes; if the value of the numerical attribute which is contained in the first synthetic data and corresponds to the value of one of the category attributes exceeds a range of values that can be assumed by the value of that numerical attribute, converts the value of that numerical attribute to a value included in the range of values that can be assumed by the value of that numerical attribute; and decodes the value of the numerical attribute which is contained in the first (Continued)

synthetic data after conversion and corresponds to the value of one of the category attributes to the value of that category attribute in accordance with the coding rule to obtain synthetic data.

3 Claims, 5 Drawing Sheets

(56) References Cited

U.S. PATENT DOCUMENTS

| | | | | |
|---|---|---|---|---|
| 2014/0115007 | A1* | 4/2014 | Harvey | H04L 41/50 |
| | | | | 707/796 |
| 2016/0019271 | A1* | 1/2016 | Ma | G06F 16/955 |
| | | | | 707/756 |
| 2018/0018590 | A1* | 1/2018 | Szeto | G06N 20/10 |
| 2018/0165475 | A1* | 6/2018 | Veeramachaneni | G06F 16/221 |
| 2020/0327252 | A1* | 10/2020 | McFall | G06F 21/78 |
| 2021/0406362 | A1* | 12/2021 | Zhong | H04L 63/1416 |

OTHER PUBLICATIONS

Okada et al., "Privacy Preserved Synthetic Datasets Generation by Using Statistics", CSS 2017, Oct. 2017, pp. 1366-1372 (with partial translation).

National Statics Center, "Development and Utilization of Educational Synthetic Microdata—Citing 2004 National Survey of Family Income and Expenditure—", Working Paper No. 16, 2012, (with partial translation), 61 page.

Z. Huang et al., "Deriving Private Information From Randomized Data", In Proceedings of the 2005 ACM Sigmod international conference on Management of data, pp. 37-48. ACM, 2005.

H. Li et al., "Differentially Private Synthesization of Multi-Dimensional Data Using Copula Functions", In Advances in database technology: proceedings. International Conference on Extending Database Technology, vol. 2014, pp. 475-486. NIH Public Access, 2014, 12 pages.

* cited by examiner

| AGE | HEIGHT | WEIGHT | OCCUPATION | EDUCATIONAL BACKGROUND | BLOOD TYPE |
|---|---|---|---|---|---|
| 28 | 178 | 71 | OFFICE WORKER | UNIVERSITY (MASTER) | AB |
| 60 | 169 | 68 | OFFICE WORKER | UNIVERSITY (BACHELOR) | A |
| 43 | 151 | 43 | SELF-EMPLOYED | HIGH SCHOOL | O |

| CODE | OCCUPATION |
|------|------------|
| 1 | OFFICE WORKER |
| 2 | PUBLIC EMPLOYEE |
| 3 | SELF-EMPLOYED |

| CODE | EDUCATIONAL BACKGROUND |
|------|------------------------|
| 1 | JUNIOR HIGH SCHOOL |
| 2 | HIGH SCHOOL |
| 3 | UNIVERSITY (BACHELOR) |

| CODE | BLOOD TYPE |
|------|------------|
| 1 | A |
| 2 | B |
| 3 | O |
| 4 | AB |

FIG. 4

BEFORE CODING

| AGE | HEIGHT | WEIGHT | OCCUPATION | EDUCATIONAL BACKGROUND | BLOOD TYPE |
|---|---|---|---|---|---|
| 28 | 178 | 71 | OFFICE WORKER | UNIVERSITY (BACHELOR) | AB |
| 60 | 169 | 68 | OFFICE WORKER | HIGH SCHOOL | A |
| 43 | 151 | 43 | SELF-EMPLOYED | HIGH SCHOOL | O |

AFTER CODING

| AGE | HEIGHT | WEIGHT | OCCUPATION | EDUCATIONAL BACKGROUND | BLOOD TYPE |
|---|---|---|---|---|---|
| 28 | 178 | 71 | 1 | 3 | 4 |
| 60 | 169 | 68 | 1 | 2 | 1 |
| 43 | 151 | 43 | 3 | 2 | 3 |

FIG. 5

SYNTHETIC DATA GENERATION APPARATUS, METHOD FOR THE SAME, AND PROGRAM

TECHNICAL FIELD

The present invention relates to synthetic data generation techniques.

BACKGROUND ART

Figure 1:
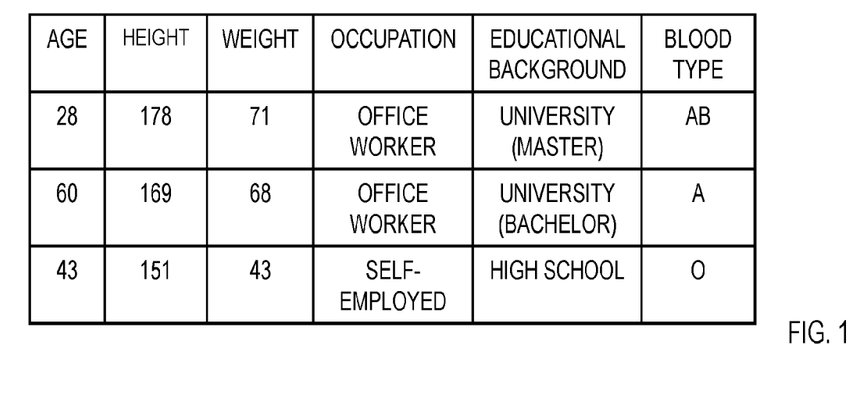
FIG. 1 shows an example of data in tabular format handled herein.

In the area of privacy protection, synthetic data as a substitute for personal information can be generated for analysis and the like when original data containing personal information cannot be handled due to concerns about security and the like. Consider here a case of creating synthetic data in tabular format from original data in tabular format. An example of data in tabular format is shown in FIG. 1. The data in tabular format is regarded as a matrix, and a row vector is called a record and a column vector is called an attribute. The original data and synthetic data can be different in the number of rows but are the same in the number of columns. The number of rows of the original data is assumed to be n>0 and the number of rows of the synthetic data is assumed to be n'>0. Assume that only character strings are stored in the original data and the synthetic data.

Data in tabular format such as the one shown in FIG. 1 can contain numerical attributes such as age, height, and weight, and category attributes such as occupation, educational background, and blood type. In a case of a table for which synthetic data to be created only has numerical attributes, one conventional way to generate synthetic data is to format random numbers so that they can maintain relationships (such as variance-covariance and correlation) among the attributes in the original data. A known method of generating synthetic data that maintains the relationships among all the attributes of original data containing numerical attributes and category attributes is Non-patent Literature 1. In Non-patent Literature 1, all the sets of categories existing in the original data are numerated, synthetic data that maintains the natures of the numerical attributes in the original data is generated for each set of categories, and the generated synthetic data are integrated, thereby maintaining the natures among the attributes in the original data as a whole.

PRIOR ART LITERATURE

Non-Patent Literature

Non-patent Literature 1: National Statics Center, "Development and Utilization of Educational Synthetic Microdata—Citing 2004 National Survey of Family Income and Expenditure—", 2012.

SUMMARY OF THE INVENTION

Problems to be Solved by the Invention

However, generation of synthetic data containing category attributes according to the conventional techniques requires synthetic data that maintains the natures among attributes to be generated as many as the number of sets of categories existing in the original data. Thus, efficiency of calculation decreases as the sets of categories increase.

An object of the present invention is to provide a synthetic data generation apparatus, a method for the same, and a program for generating synthetic data that maintains the relationships among all the attributes in the original data containing category attributes, also for synthetic data containing category attributes with a similar efficiency to that for synthetic data containing only numerical attributes.

Means to Solve the Problems

To attain the object, a synthetic data generation apparatus according to an aspect of the present invention includes: a coding unit that codes a value of each of category attributes contained in original data into a value of a numerical attribute in accordance with a coding rule; a data formatting unit that generates first synthetic data from the original data after coding using a synthetic data generation method for numerical attributes; a conversion unit that, if the value of the numerical attribute which is contained in the first synthetic data and corresponds to the value of one of the category attributes exceeds a range of values that can be assumed by the value of that numerical attribute, converts the value of that numerical attribute to a value included in the range of values that can be assumed by the value of that numerical attribute; and a decoding unit that decodes the value of the numerical attribute which is contained in the first synthetic data after conversion and corresponds to the value of one of the category attributes to the value of that category attribute in accordance with the coding rule to obtain synthetic data.

To attain the object, a synthetic data generation method for execution by a synthetic data generation apparatus according to another aspect of the present invention includes: a coding step of coding a value of each of category attributes contained in original data into a value of a numerical attribute in accordance with a coding rule; a data formatting step of generating first synthetic data from the original data after coding using a synthetic data generation method for numerical attributes; a conversion step of, if the value of the numerical attribute which is contained in the first synthetic data and corresponds to the value of one of the category attributes exceeds a range of values that can be assumed by the value of that numerical attribute, converting the value of that numerical attribute to a value included in the range of values that can be assumed by the value of that numerical attribute; and a decoding step of decoding the value of the numerical attribute which is contained in the first synthetic data after conversion and corresponds to the value of one of the category attributes to the value of that category attribute in accordance with the coding rule to obtain synthetic data.

Effects of the Invention

The present invention has an effect of being able to generate synthetic data that maintains the relationships among all the attributes in the original data containing category attributes, also for synthetic data containing category attributes with a similar efficiency to that for synthetic data containing only numerical attributes.

DETAILED DESCRIPTION OF THE EMBODIMENTS

An embodiment of the present invention is described below. In the drawings used in the following description, components having the same functions and steps that perform the same processing are given the same reference characters and overlapping description is avoided. In the following description, although symbols used in the text, such as "⁻", should be placed just above the immediately preceding letter, they are placed immediately after the corresponding letter due to limitation in text notation. In formulas, such symbols are placed at the position they are supposed to be. In addition, processing that is performed on each element of a vector or a matrix is intended to be applied to all the elements of the vector or matrix otherwise specified.

<Outline of First Embodiment>

A category attribute is converted to a numerical attribute by coding (for example, binarization). For example, the category attributes of original data are coded so that the original data is converted to a table having only numerical attributes. Based on the converted table, synthetic data only with numerical attributes is generated by a certain synthetic data generation method for numerical attributes. By decoding the numerical values of the category attributes of the synthetic data only with numerical attributes into the original category values, synthetic data containing the category attributes is generated. In this way, only one operation is required to generate synthetic data with high computational complexity. Thus, generation of synthetic data can be performed efficiently even with a larger number of sets of categories. In other words, the efficiency of calculation is improved because processing for maintaining natures among attributes can be done at a time.

First Embodiment

Figure 2:
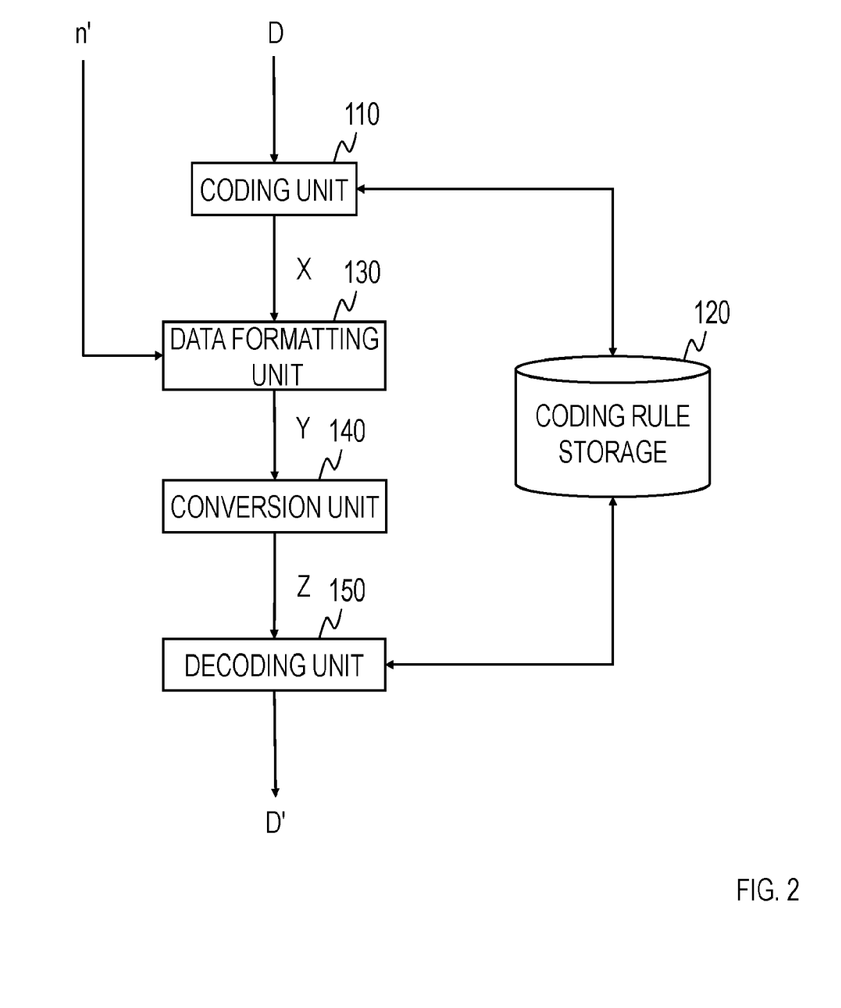
FIG. 2 is a functional block diagram of a synthetic data generation apparatus according to a first embodiment.
Figure 3:
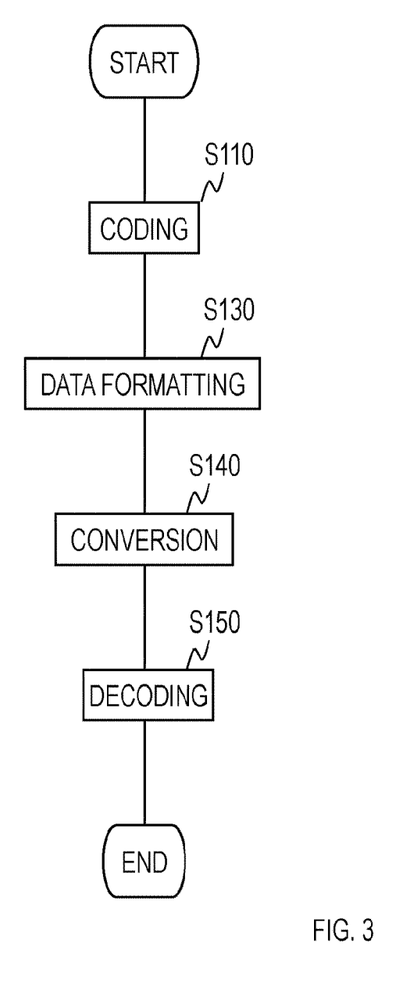
FIG. 3 shows an exemplary processing flow of the synthetic data generation apparatus according to the first embodiment.

FIG. 2 shows a functional block diagram of a synthetic data generation apparatus according to a first embodiment, and FIG. 3 shows a processing flow of the apparatus.

The synthetic data generation apparatus according to the first embodiment includes a coding unit 110, a coding rule storage 120, a data formatting unit 130, a conversion unit 140, and a decoding unit 150.

The synthetic data generation apparatus is a special device configured by loading of a special program into a well-known or a dedicated computer having a central processing unit (CPU), main storage unit (random access memory: RAM) and the like, for example. The synthetic data generation apparatus executes various kinds of processing under control of the central processing unit, for example. Data input to the synthetic data generation apparatus and data resulting from processing are stored in the main storage unit, for example, and the data stored in the main storage unit is read into the central processing unit and utilized for other processing as necessary. The processing components of the synthetic data generation apparatus may be at least partially composed of hardware such as an integrated circuit. Storages of the synthetic data generation apparatus can include the main storage unit such as random access memory (RAM), auxiliary storage unit composed of a hard disk, an optical disk, or a semiconductor memory device such as flash memory, or middleware such as a relational database or a key value store, for example.

The synthetic data generation apparatus according to the first embodiment takes, as input, original data D and the number of records n' which is contained in synthetic data to be generated, and generates and outputs synthetic data D'. The synthetic data D' is generated so that a histogram and a two-dimensional cross-tabulation table for each attribute in the original data and a histogram and a two-dimensional cross-tabulation table for the attribute in the synthetic data approximate each other. The accuracy of approximation is related to the magnitude of the number of records n' contained in the synthetic data: the accuracy of approximation tends to be higher as n' is greater.

Processing operations performed by the components are described below.

<Coding Rule Storage 120>

Figure 4:
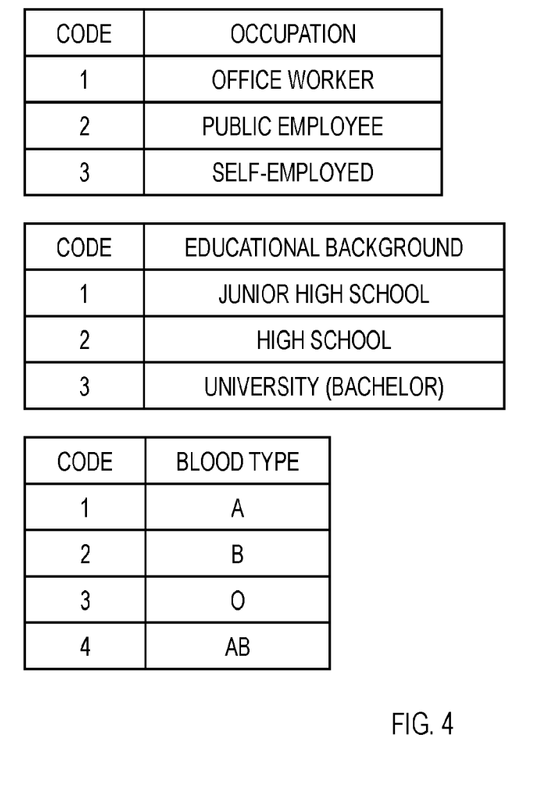
FIG. 4 shows an example of a coding rule.

The coding rule storage 120 stores a coding rule. FIG. 4 shows an example of the coding rule. For example, the coding rule indicates correspondence between a code and the value of a category attribute.

<Coding Unit 110>

Input: original data D

Output: data in tabular format (the original data after coding) X with the category attribute values coded (converted into the form of numerical vectors)

Figure 5:
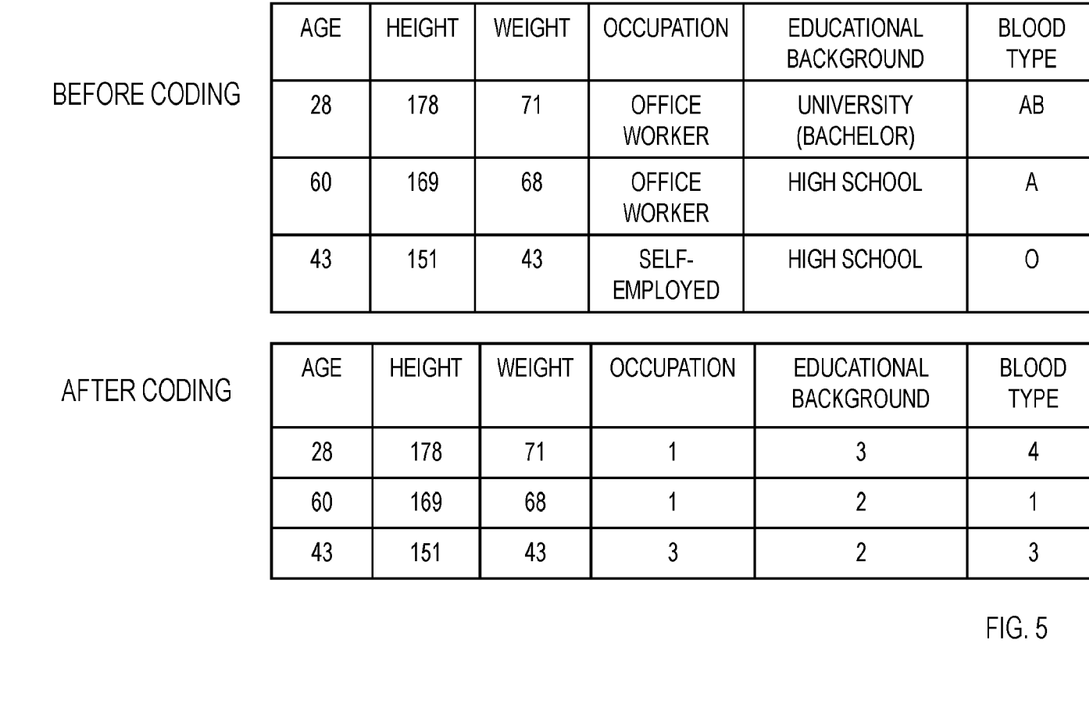
FIG. 5 shows an example of data before coding and data after coding in a coding unit.

The coding unit 110 codes the value of each category attribute contained in the original data D into a value of a numerical attribute in accordance with a coding rule (see FIG. 4, for instance) (converts it into a numerical vector) (S110), and outputs original data X after coding. FIG. 5 shows an example of the original data before coding and the original data after coding.

For example, the values of all the category attributes in the original data D are converted to numerical vectors by a known 1-of-K coding method and the converted original data X is output.

For example, the 1-of-K coding method includes the following four types. For the sake of convenience, they are described as coding methods A, B, C, and D here. The finally obtained result of synthetic data D' varies depending on the method used, so a method by which synthetic data D' can be made more approximate to the original data D is used in the present technique.

Coding method A: A method sets $S_1=(0, 0)$, $S_2=(1, 0)$, and $S_3=(0, 1)$ when the values that can be assumed by a certain attribute are $(S_1, S_2, S_3)$. This method can represent $2^p$ patterns of category attribute values using a bit string of length p.

Coding method B: A method sets $S_1=(1, 0, 0)$, $S_2=(0, 1, 0)$, and $S_3=(0, 0, 1)$ when the values that can be assumed by a certain attribute are $(S_1, S_2, S_3)$. This method can represent p patterns of category attribute values using a bit string of length p.

Coding method C: A method sets $S_1=0$, $S_2=1$, and $S_3=2$ when the values that can be assumed by a certain attribute are $(S_1, S_2, S_3)$.

Coding method D: A method sets $S_1=1$, $S_2=2$, and $S_3=3$ when the values that can be assumed by a certain attribute are $(S_1, S_2, S_3)$. The coding methods C and D can represent p patterns of category attribute values using p numerical values.

For example, the coding method D is used in FIG. 4.

<Data Formatting Unit 130>

Input: the original data X after coding and the number of records n' contained in synthetic data Output: first synthetic data Y The data formatting unit 130 generates first synthetic data Y containing a desired number of records n' from the original data X after coding using a synthetic data generation method for numerical attributes (S130) and outputs it. For the synthetic data generation method for numerical attributes, various known techniques can be utilized. For example, a method described in Reference Literature 1 or Reference Literature 2 can be utilized.

(Reference Literature 1) Zhengli Huang, Wenliang Du, and Biao Chen. "Deriving private information from randomized data", In Proceedings of the 2005 ACM SIGMOD international conference on Management of data, pp. 37-48. ACM, 2005.

(Reference Literature 2) Haoran Li, Li Xiong, and Xiaoqian Jiang. "Differentially private synthesization of multi-dimensional data using copula functions", In Advances in database technology: proceedings. International Conference on Extending Database Technology, Vol. 2014, p. 475. NIH Public Access, 2014.

<Conversion Unit 140>

Input: the first synthetic data Y

Output: first synthetic data Z after conversion

If the value of a numerical attribute which is contained in the first synthetic data Y and corresponds to the value of a category attribute exceeds a range of values that can be assumed by the value of that numerical attribute, the conversion unit 140 converts the value of that numerical attribute to a value included in the range of values that can be assumed by the value of that numerical attribute (S140), and outputs the first synthetic data Z after conversion.

The value of a category attribute portion in the first synthetic data Y may have changed from the original code format at the data formatting unit 130. Thus, if the value of a category attribute portion in the first synthetic data Y is not in the original code format, the conversion unit 140 reformalizes it into the original code format. An example of this is shown below.

(When coding method A or B is used in coding unit 110)

Assume that the value of a category attribute of the jth length $l_j$ in the ith record is $S_j^{(i)} = (s_1^{(i)}, s_2^{(i)}, \ldots, s_{l\_j}^{(i)})$ (where the subscript 1_j means $1_j$), and $$\overline{s}_j = \sum_{i=1}^{n} (s_1^{(i)} + s_2^{(i)} + \ldots + s_{l_j}^{(i)} I(n \cdot I_j).$$

Then, it is checked whether each element of $S_j^{(i)}$ exceeds $s^-_j$ and if there is an exceeding element, the maximum in the set of exceeding elements is set to 1 and all of the other elements are set to 0. If there is no exceeding element, all the elements are set to 0. However, a method that sets $s^-_j$ to an arbitrary value is also possible.

(When coding method C is used in coding unit 110)

Assume that the value of a category attribute of the jth length 1, in the ith record is $S_j^{(i)}$. Then, $S_j^{(i)} \leftarrow 0$ is assumed when each $S_j^{(i)}$ is a value smaller than 0, and $S_j^{(i)} \leftarrow 1_j - 1$ is assumed when it is a value greater than $l_j - 1$. When $0 \leq S_j^{(i)} \leq l_j - 1$, the integer portion of $S_j^{(i)}$ is used as it is.

(When coding method D is used in coding unit 110)

Assume that the value of a category attribute of the jth length $l_j$ in the ith record is $S_j^{(i)}$. Then, $S_j^{(i)} \leftarrow 1$ is assumed when each $S_j^{(i)}$ is a value smaller than 1, and $S_j^{(i)} \leftarrow 1_j$ is assumed when it is a value greater than $l_j$. When $1 \leq S_j^{(i)} \leq l_j$, the integer portion of $S_j^{(i)}$ is used as it is.

<Decoding Unit 150>

Input: the first synthetic data Z after conversion

Output: synthetic data D' in tabular format produced by decoding the category attributes in the form of numerical values in the first synthetic data Z after conversion into category values.

The decoding unit 150 decodes the value of the numerical attribute which is contained in the first synthetic data Z after conversion and corresponds to the value of each of the category attributes to the value of that category attribute in accordance with the coding rule (see FIG. 4) (S150) to obtain synthetic data D', and outputs it.

For example, as the coding methods A, B, C, and D described above are bijective (one-to-one correspondence), the reverse operation (decoding) can be also uniformly performed by maintaining their correspondences.

Effect

The foregoing configuration can generate synthetic data that maintains the relationships among all the attributes in the original data containing category attributes, also for synthetic data containing category attributes with a similar efficiency to that for synthetic data containing only numerical attributes.

Other Modifications

The present invention is not limited to the above embodiment and modification. For example, the above-described various kinds of processing may be executed, in addition to being executed in chronological order in accordance with the descriptions, in parallel or individually depending on the processing power of an apparatus that executes the processing or when necessary. In addition, changes may be made as appropriate without departing from the spirit of the present invention.

<Program and Recording Medium>

Further, various types of processing functions in the apparatuses described in the above embodiment and modification may be implemented on a computer. In that case, the contents of processing function to be contained in each apparatus are written by a program With this program executed on the computer, various types of processing functions in the above-described apparatuses are implemented on the computer.

This program in which the contents of processing are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be distributed by storing the program in a storage device of a server computer and transferring the program from the server computer to other computers via a network.

A computer which executes such program first stores the program recorded in a portable recording medium or transferred from a server computer once in a storage thereof, for example. When the processing is performed, the computer reads out the program stored in the storage thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that the program includes information which is provided for processing performed by electronic calculation equipment and which is equivalent to a program (such as data which is not a direct instruction to the computer but has a property specifying the processing performed by the computer).

Moreover, the apparatuses are assumed to be configured with a predetermined program executed on a computer. However, at least part of these processing contents may be realized in a hardware manner.

What is claimed is:

1. A synthetic data generation apparatus comprising:
storage that stores a coding rule which indicates correspondence between a code and a value of a category attribute, and
processing circuitry configured to:
code a value of each of category attributes contained in original data into a value of a numerical attribute in accordance with the coding rule;
generate first synthetic data from the original data after coding using a synthetic data generation method for numerical attributes;
if the value of the numerical attribute which is contained in the first synthetic data and corresponds to the value of one of the category attributes exceeds a range of values that can be assumed by the value of that numerical attribute, convert the value of that numerical attribute to a value included in the range of values that can be assumed by the value of that numerical attribute; and
decode the value of the numerical attribute which is contained in the first synthetic data after conversion and which corresponds to the value of one of the category attributes to the value of that category attribute in accordance with the coding rule to obtain synthetic data, wherein
the value of the numerical attribute is a value that can be measured numerically, and the value of the category attribute is a value that cannot be measured numerically,
the coding rule is a 1-of-K coding method, and
the synthetic data maintains relationships among all the attributes in the original data, wherein
(i) the relationships are variance-covariance or (ii) the relationships are correlation.

2. A non-transitory computer-readable recording medium having recorded thereon a program for causing a computer to function as the synthetic data generation apparatus according to claim 1.

3. A synthetic data generation method for execution by a synthetic data generation apparatus that includes storage and processing circuitry, the synthetic data generation method comprising:
a coding step in which the processing circuitry codes a value of each of category attributes contained in original data into a value of a numerical attribute in accordance with a coding rule which is stored in the storage and indicates correspondence between a code and a value of a category attribute;
a data formatting step in which the processing circuitry generates first synthetic data from the original data after coding using a synthetic data generation method for numerical attributes;
a conversion step in which, if the value of the numerical attribute which is contained in the first synthetic data and corresponds to the value of one of the category attributes exceeds a range of values that can be assumed by the value of that numerical attribute, the processing circuitry converts the value of that numerical attribute to a value included in the range of values that can be assumed by the value of that numerical attribute; and
a decoding step in which the processing circuitry decodes the value of the numerical attribute which is contained in the first synthetic data after conversion and which corresponds to the value of one of the category attributes to the value of that category attribute in accordance with the coding rule to obtain synthetic data, wherein
the value of the numerical attribute is a value that can be measured numerically, and the value of the category attribute is a value that cannot be measured numerically,
the coding rule is a 1-of-K coding method, and
the synthetic data maintains relationships among all the attributes in the original data, wherein
(i) the relationships are variance-covariance or (ii) the relationships are correlation.

* * * * *